United States Patent [19]

Azuma et al.

[11] Patent Number: 5,318,623
[45] Date of Patent: Jun. 7, 1994

[54] PROCESS FOR PRODUCING METAL PHTHALOCYANINE PIGMENT

[75] Inventors: Shinichi Azuma; Takashi Kano; Takanori Miyake; Hideo Shimizu, all of Tokyo, Japan

[73] Assignee: Toyo Ink Manufacturing Co., Ltd., Tokyo, Japan

[21] Appl. No.: 54,979

[22] Filed: Apr. 30, 1993

[30] Foreign Application Priority Data

May 29, 1992 [JP] Japan .................................. 4-164346

[51] Int. Cl.$^5$ ............................................. C09B 67/50
[52] U.S. Cl. ..................................... 106/410; 106/412; 106/413; 540/122; 540/139; 540/142; 540/144
[58] Field of Search ............... 106/410, 412, 413; 540/144, 139, 122, 142

[56] References Cited

U.S. PATENT DOCUMENTS

| 2,602,800 | 7/1952 | Barnhart | 106/410 |
| 3,028,392 | 4/1962 | Dudnikov | 106/410 |
| 4,294,620 | 10/1981 | Sappok et al. | 106/413 |

FOREIGN PATENT DOCUMENTS

| 45-7662 | 3/1970 | Japan . |
| 47-30892 | 8/1972 | Japan . |
| 48-38332 | 6/1973 | Japan . |
| 50-41926 | 4/1975 | Japan . |
| 52-19216 | 5/1977 | Japan . |
| 58-23854 | 2/1983 | Japan . |
| 61-203175 | 9/1986 | Japan . |
| 63-207858 | 8/1988 | Japan . |

Primary Examiner—Karl Group
Assistant Examiner—Scott L. Hertzog
Attorney, Agent, or Firm—Sughrue, Mion, Zinn, Macpeak & Seas

[57] ABSTRACT

A process for producing a metal phthalocyanine pigment which comprises the steps of: reacting phthalic anhydride or a derivative thereof with urea or a derivative thereof with heating in the presence of a catalyst either in the presence or absence of an organic solvent; adding to the reaction mixture of the preceding step a metal or its compound capable of constituting the core of the metal phthalocyanine either alone or together with urea or a derivative thereof, without isolating the reaction product from the reaction mixture of the preceding step; and allowing the reaction mixture to react while simultaneously applying a mechanical grinding force in the presence or absence of a grinding agent.

6 Claims, 1 Drawing Sheet

PROCESS FOR PRODUCING METAL PHTHALOCYANINE PIGMENT

FIELD OF THE INVENTION

The present invention relates to a process for producing a metal phthalocyanine pigment such as, e.g., copper phthalocyanine, which has exceedingly good weathering resistance, heat resistance, chemical resistance, and other properties as compared with other organic pigments and has a clear bright color shade and high tinting strength. Therefore, a metal phthalocyanine is extensively used, for example, as an excellent blue pigment for inks, paint compositions, and plastics. More particularly, the present invention relates to a process for direct production in which the synthesis and the size reduction of a metal phthalocyanine pigment are conducted simultaneously, and also relates to a process for producing a crude product for a metal phthalocyanine pigment.

BACKGROUND OF THE INVENTION

Since copper phthalocyanine pigment is the most representative of all metal phthalocyanine pigments, prior art techniques are described below with respect to copper phthalocyanine pigment as an example.

In general, processes for producing copper phthalocyanine pigment are composed of the step of synthesizing crude copper phthalocyanine in the form of coarse particles and the step of reducing the size of the crude phthalocyanine into pigment-sized fine particles to provide a pigment (pigmentation step).

(1) Synthesis Step

Examples of the known method for the synthesis step include a method in which phthalic anhydride or a derivative thereof is heated along with copper or a compound thereof, urea or a derivative thereof, and a catalyst at a temperature of 180° to 300° C., either in the presence or absence of an organic solvent, to allow them to react, thereby to obtain crude copper phthalocyanine.

In another method, for example, a mixture of phthalonitrile and either copper or a compound thereof is reacted by heating at a temperature of 180° to 300° C. either in the presence or absence of an organic solvent.

(2) Pigmentation Step

Because the crude copper phthalocyanine obtained in the above conventional synthesis step is in the form of agglomerates of course particles, it has a dull (darker) color shade and poor tinting strength if used as it is. Thus, the crude copper phthalocyanine is unsuited for practical use and, hence, it is necessary to conduct a pigmentation step for reducing the size of the crude product to pigment-sized fine particles thereby to impart tinting strength (color strength), clearness, and pigment suitability.

The conventional pigmentation step include a chemical method in which the crude product is dissolved in or wetted by an acid, such as concentrated sulfuric acid, and is then poured into a large amount of water and reprecipitated thereby to obtain fine particles (acid paste method or acid slurry method), and a physical method in which the crude product is size-reduced to fine particles by mechanical grinding using a ball mill, kneader, or the like.

However, the process composed of the synthesis of copper phthalocyanine and subsequent pigmentation has the following problems.

(1) The process is costly because it is long and the equipment should be large-scaled.

(2) The pigmentation step, when conducted by the chemical method, has serious problems in that the apparatus is corroded by the sulfuric acid treatment and a large amount of waste acid discharged must be treated.

(3) The pigmentation step, when conducted by the physical method, has serious problems in that the mechanical grinding requires a large amount of power, the treating time is long and the production efficiency is low, the recovery of a large amount of a grinding agent, e.g., sodium chloride, entails much cost, and high-COD wastewater must be treated.

(4) In the case of using phthalic anhydride or a derivative thereof as a raw material, the removal and recovery of solvent should be conducted twice because a lipophilic solvent is used in the synthesis step, while a hydrophilic solvent is used in the pigmentation step using the physical method, thus making the process uneconomical.

As an expedient for eliminating these problems, direct production processes in which the synthesis step and the pigmentation step are conducted simultaneously are being developed and investigated enthusiastically.

These direct processes can be roughly divided into the following two groups; those in which phthalonitrile is used as a starting material, and those in which phthalic anhydride or a derivative thereof is used as a starting material.

The process using phthalonitrile as a starting material has an advantage that the control of crystal growth is relatively easy because phthalonitrile has so high reactivity that it is possible to yield copper phthalocyanine at low temperatures. In particular, fine particles can be obtained when a hydrophilic organic solvent in which crystals are less apt to grow such as, for example, a glycol is used (as described, e.g., in JP-B-47-30892, JP-A-50-1032, and JP-A-58-23854). (The terms "JP-B" and "JP-A" as used herein mean an "examined Japanese patent publication" and an "unexamined published Japanese patent application", respectively.) However, there are drawbacks that phthalonitrile is expensive, and that because of the high toxicity of phthalonitrile, handling thereof requires special care for environmental protection and this costs much. This process, therefore, is difficult to conduct industrially.

In the process using phthalic anhydride or a derivative thereof as a starting material which process requires a relatively high temperature, crystals grow readily. In particular, crystal growth is accelerated further when the reaction is conducted in an organic solvent. In order to obtain copper phthalocyanine in a fine particle form, the following methods are proposed.

(1) a method in which reaction is conducted in the presence of a powerful grinding force (JP-B-45-7662 and JP-A-48-38332), (2) a method in which reaction is conducted in the presence of a crystal growth inhibitor (JP-B-52-19216, JP-A-61-203175, and JP-A-63-207858), and (3) a method in which reaction is conducted in a mixed solvent composed of a high boiling point aromatic solvent and a paraffinic or naphthenic hydrocarbon solvent, with copper or a compound thereof being added at a later stage (JP-A-50-41926).

However, method (1) above has a problem in that the material of reaction vessel dissolves or wears due to the use of the high grinding force and severe reaction conditions. Illustratively stated, in the case where the reaction vessel is made of iron, stainless steel, Hastelloy or the like, the reaction vessel does not withstand long-term use because elements, e.g., iron, nickel, chromium, etc., come to dissolve out in a considerable amount as a result of corrosion and, in addition, the elements which have dissolved out take part in the reaction to form iron phthalocyanine, nickel phthalocyanine, chromium phthalocyanine, etc., making the color shade of the resulting pigment dull. In the case of a reaction vessel lined with glass or made of titanium or the like, it wears rapidly although a pigment with a clear bright color shade can be obtained, so that the reaction vessel is unsuited for industrial use. Further, in the case of a reaction vessel made of ceramics, it is free from the above-described problems but is disadvantageous in manufacturing larger-sized vessels.

Method (2) above is disadvantageous in that the crystal growth inhibitors are generally expensive and such an inhibitor should be used in a large amount, and there are cases where the reaction is accompanied by vigorous foaming. Therefore, this method has problems concerning cost and reaction operation.

Method (3) above is disadvantageous in that the copper phthalocyanine obtained has a specific surface area as small as 40 to 50 $m^2/g$, so that the phthalocyanine as pigment is insufficient in tinting strength. The method also has a problem of low yield. In addition, since the mixed solvent composed of a high-boiling aromatic solvent and a paraffinic or naphthenic hydrocarbon solvent is employed in this method, copper phthalocyanine obtained contains a large amount of impurities and has a dull color shade.

Moreover, since a lipophilic solvent should generally be used as the reaction solvent in any of methods (1) to (3), the removal of the solvent necessitates complicated steps including extraction with alcohol, vacuum distillation, steam distillation, etc., resulting in a considerable increase in cost.

Therefore, all of methods (1), (2), and (3) have not been a fully satisfactory process.

SUMMARY OF THE INVENTION

An object of the present invention is to provide a process for producing a metal phthalocyanine pigment having improved color shade and specific surface area in a simplified method.

Other objects and effects of the present invention will be apparent from the following description.

The present inventors have made intensive studies in order to overcome the above-described prior art drawbacks and to attain the above objects. As a result, they have succeeded in finding out a direct production process for a finely powdered metal phthalocyanine pigment which process is of extremely high value from an industrial standpoint as explained below.

The present invention provides a process for producing a metal phthalocyanine pigment which comprises the steps of:

reacting phthalic anhydride or a derivative thereof with urea or a derivative thereof with heating in the presence of a catalyst either in the presence or absence of an organic solvent (a former-step reaction);

adding to the reaction mixture of the preceding step (former step) a metal or its compound capable of constituting the core of the metal phthalocyanine either alone or together with urea or a derivative thereof, without isolating the reaction product from the reaction mixture of the preceding step; and allowing the reaction mixture to react while applying a mechanical grinding force in the presence or absence of a grinding agent (a latter-step reaction).

The present invention also relates to a process for producing a metal phthalocyanine pigment which comprises the steps of:

reacting phthalic anhydride or a derivative thereof with urea or a derivative thereof with heating in the presence of a catalyst in the absence of a solvent (a former-step reaction);

adding to the reaction mixture of the preceding step (former step) a hydrophilic solvent and a metal or its compound capable of constituting the core of the metal phthalocyanine either alone or together with urea or a derivative thereof, without isolating the reaction product from the reaction mixture of the preceding step; and allowing the reaction mixture to react while simultaneously applying a mechanical grinding force in the presence or absence of a grinding agent (a latter-step reaction).

DETAILED DESCRIPTION OF THE INVENTION

Figure 1:
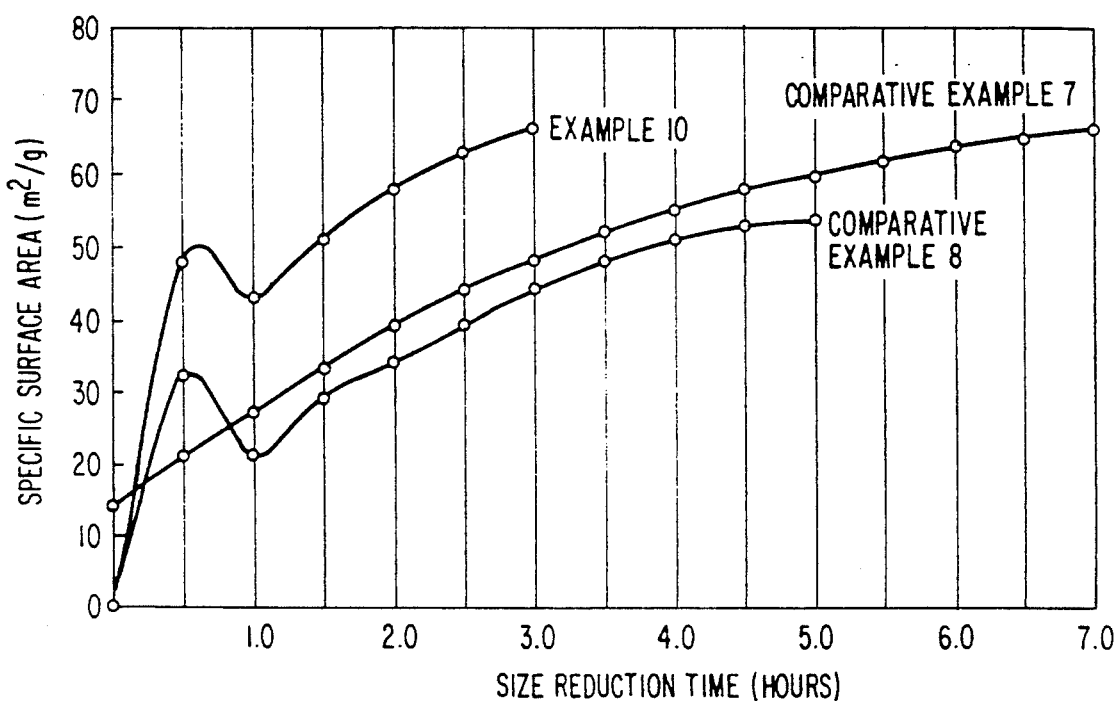
FIG. 1 is a graph showing the size reduction rate, i.e., the relationship between the size reduction time and the specific surface area.

In the conventional synthesis processes, copper phthalocyanine is obtained in the form of course particles, but application of a mechanical grinding force simultaneously with the synthesis yields a finely powdered metal phthalocyanine. However, the reaction vessel corrodes and wears extremely rapidly, and elements of the reaction vessel material that have dissolved out take part in the reaction to form by-products (e.g., metal phthalocyanines other than copper phthalocyanine, in the case of copper phthalocyanine production). These by-products not only make the color shade of the pigment product dull, but also lower the yield considerably.

The present inventors have found out an exceedingly useful fact that when phthalic anhydride or a derivative thereof is reacted beforehand with urea or a derivative thereof with heating in the presence of a catalyst either in the presence or absence of an organic solvent, the reaction vessel made of a metal such as steel or a Hastelloy suffers almost no corrosion. By thus conducting the reaction stepwise, the coexistence of water with a metal chloride, which is a cause of corrosion, can be avoided. In the present invention, it is preferable to remove the water generated in the former-step reaction between phthalic anhydride or a derivative thereof and urea or a derivative thereof.

The present inventors have also found a fact that even when a metal or its compound capable of constituting the core is added at a later stage after formation of an intermediate in the former-step reaction and a mechanical grinding force is simultaneously applied, the corrosion of the reaction vessel during the step of metal phthalocyanine formation is extremely slight.

Consequently, this method in which a metal or its compound capable of constituting the core is added at a later stage has brought about the following effects. That is, it is possible to employ a material which wears little but has conventionally been regarded as unusable due to corrosion. Further, even when a metal or its compound capable of constituting the core is added at a later stage to form a metal phthalocyanine while simultaneously applying a mechanical grinding force, the mechanical grinding neither results in a decrease in product quality or yield due to corrosion or wear nor leads to a cost increase due to shortening the life of reaction vessel. Thus, a metal phthalocyanine pigment in the form of extremely fine particles can be directly produced which is completely satisfactory in the various properties usually required of metal phthalocyanine pigments.

It is preferred that urea or a derivative thereof be added also at a later stage when a metal or its compound capable of constituting the core is added; this is effective in further improving yield and quality.

In addition, as compared to the conventional direct synthesis processes in which a mechanical grinding force is applied, the process of the present invention needs a lower energy cost for particle size reduction because the size of pigment particles can be reduced at a higher rate in the present invention than the conventional processes when the same mechanical grinding power is applied (as shown in FIG. 1). This is considered to be because in the process of the present invention, crystal nuclei generate in a larger amount and the concentration of the copper phthalocyanine which serves for crystal growth is lower as compared with the conventional processes, since the process of the present invention is conducted in two steps so that an environment suited for the sufficient generation of a metal phthalocyanine is created in the former step and, thereafter, a metal capable of constituting the core or a compound of the metal is added and cyclization reaction is conducted in the latter step.

The present inventors have further found that the former-step reaction, in which phthalic anhydride or a derivative thereof is reacted beforehand with urea or a derivative thereof with heating in the presence of a catalyst, involves little foaming and can be carried out without a solvent. If copper chloride or the like is added simultaneously with the other starting materials, the reaction proceeds rapidly, resulting in foaming due to vigorous generation of ammonia. In contrast, in the present invention, foaming is little because copper chloride or the like which causes vigorous generation of ammonia is not present during the former-step reaction. Further, the conventional processes have necessitated the use of a large amount of a reaction solvent because of the foaming problem and for other reasons, whereas in the present invention, foaming is little and the amount of a reaction solvent can hence be reduced. As a result, the feed amount of the reactants relative to the solvent amount can be increased in the present invention. The higher reactant concentration thus leads to a higher reaction rate, so that the production with high efficiency becomes possible.

It has also been found that in the latter step, in which a metal capable of constituting the core or a compound of the metal is added after the former step and a metal phthalocyanine pigment is formed, it is possible to use a hydrophilic solvent such as alcohols.

It is thus possible to use hydrophilic solvents such as alcohols, which have conventionally been unable to be used in the synthesis of metal phthalocyanines from phthalic anhydride or a derivative thereof because they induce side reactions to inhibit the formation of the desired metal phthalocyanines. As a result, solvent removal can be accomplished by water washing as in the conventional pigmentation step. In view of this advantage and the advantage of requiring a lower power cost as described above, the process of the present invention is of a great economical value.

Although a finely powdered pigment is obtained by the present invention, there are cases where the pigment is required to be further subjected to pigmentation to finer particles according to the use of the pigment or according to the conditions employed in the process of the invention. In such a case, the pigment obtained in the present invention, which generally can be called a crude metal phthalocyanine pigment, may be further subjected to a pigmentation step. The crude metal phthalocyanine pigment of the present invention has advantages in that it can be easily subjected to pigmentation to pigment-sized particles, the pigmentation step can be carried out within a shorter time period, and even pigmentation into far finer particles can be conducted relatively easily, unlike conventional crude phthalocyanine pigments.

Examples of the phthalic anhydride or its derivative to be used in the present invention include, as is well known through a various literature, phthalic acid and salts or esters thereof, phthalic anhydride, phthalimide, phthalamic acid and salts or esters thereof, and phthalonitrile. Examples thereof further include compounds having the same structures as the above-enumerated compounds provided that they have a substituent such as a chlorine atom, a bromine atom, an alkyl group, a phenyl group, or a sulfonic group on the benzene nucleus.

Examples of the urea or its derivative to be used in the present invention include urea and ammonia. The total amount of the urea or a derivative thereof to be used is generally about from 4 to 40 mol, preferably from 4 to 20 mol, per 4 mol of the phthalic anhydride or its derivative. The amount of the urea or a derivative thereof to be used in the former-step reaction is generally from 4 to 40 mol, preferably from 4 to 20 mol, per 4 mol of the phthalic anhydride or its derivative. The amount of the urea or a derivative thereof to be used in the latter-step reaction is generally from 0 to 20 mol, preferably from 0 to 10 mol, per 4 mol of the phthalic anhydride or its derivative.

The term "a metal or its compound capable of constituting the core of the metal phthalocyanine" used herein means a metal capable of constituting the core of the metal phthalocyanine or its compound capable of constituting the core. Examples of the metal or its compound to be used in the present invention includes such metals as cooper, titanium, vanadium, chromium, manganese, cobalt, nickel, iron, and zinc, and the halides, sulfates, hydroxide, acetates, carbonates, oxides, cyanides, phosphates, nitrates, and sulfides of those metals. The amount of the metal or a compound thereof to be used is generally about from 0.8 to 1.3 mol per 4 mol of phthalic anhydride or its derivative.

Examples of the catalyst to be used in the present invention include molybdenum compounds such as ammonium molybdate, molybdenum oxide and phosphorus molybdate; titanium compounds such as titanium tetrachloride and titanic acid esters; zirconium compounds such as zirconium chloride and zirconium carbonate; antimony oxide; arsenic oxide; and boric acid. The amount of the catalyst is generally from 0.01 to 5% by weight, preferably from 0.03 to 2% by weight, based on the amount of the phthalic anhydride or its derivative.

Examples of the organic solvent which may be used in the present invention include aromatic hydrocarbons such as alkylbenzenes, alkylnaphthalenes, a tetralin; alicyclic hydrocarbons such as alkylcyclohexanes, decalin, and alkyldecalins; aliphatic hydrocarbons such as decane and dodecane; and nitrobenzene, o-nitrotoluene, trifluorobenzene, dichlorobenzene, chloronaphthalene, diphenyl ether, sulfolane, dimethyl sulfoxide, methylsulfolane, dimethylsulfolane, N-methylpyrrolidone, and dimethylimidazolidinone. As the organic solvent which may be used in the latter-step reaction with the addition of the metal capable of constituting the core or a compound of the metal, a hydrophilic solvent can be employed, in addition to the above-enumerated solvents. Examples of the hydrophilic solvent include alcohols such as butyl alcohol, ethylene glycol, and poly(ethylene glycol); Cellosolves such as ethyl Cellosolve and diethylene glycol; and dimethylformamide, formamide, a dimethylacetamide. These organic solvents may be used alone or as a mixture of two or more thereof. The amount of the solvent, if used, is generally from 0.3 to 30 times by weight, preferably from 0.5 to 11 times by weight, the amount of the phthalic anhydride or its derivative.

Examples of the grinding agent which may be used in the present invention include alkali metal salts such as sodium chloride, sodium sulfate, potassium chloride and potassium sulfate, and alkaline earth metal salts such as calcium chloride and barium chloride. The grinding agent may be a mixture of two or more of these. The amount of the grinding agent to be used is generally about from 1 to 12 times by weight the amount of phthalic anhydride or its derivative. It is preferred to use metal beads or ceramic beads for the purpose of conducting the grinding more efficiently.

The torque of the mechanical grinding force to be applied in the latter-step reaction is preferably 0.4 kgf.cm or more per 1 g of the pigment to be obtained.

If necessary, a halide or ammonium salt such as ammonium chloride or ammonium carbonate may be added in order to heighten reactivity. Such a compound may be used in an amount of about from 1 to 40 mol per 4 mol of phthalic anhydride or its derivative.

The material of the reaction vessel for use in the present invention preferably is stainless steel from the standpoints of corrosion resistance required for water washing and of wear resistance, cost, etc. If a higher degree of corrosion resistance is desired, a Hastelloy is preferred. However, the material of the reaction vessel is not limited to stainless steel and Hastelloys as long as the material selected satisfies the requirements mentioned above.

Examples of the reaction vessel for use in the present invention, which has a means for applying a mechanical grinding force, include a kneader, a ball mill, an oscillating mill, an Attritor, a sand mill, a Banbury mixer, and a twin-screw extruder. Although a mechanical grinding force may be applied from the former-step reaction, it is preferable, from the standpoint of energy saving, to apply the force during and after the addition of the metal capable of constituting the core or a compound of the metal and during the formation of a metal phthalocyanine.

Pressure conditions for the present invention are not particularly limited. However, it is preferred to conduct the reaction under high-pressure conditions of from 1 to 30 kg/cm$^2$G, more preferably from 2 to 10 kg/cm$^2$G, from the standpoints of inhibiting thermal decomposition to save urea and its derivative and inhibiting side reactions to improve quality.

The temperature for the process of the present invention is preferably from 150° to 250° C. The temperature for the former-step reaction and that for the latter-step reaction may be the same or different.

According to the present invention, a finely powdered metal phthalocyanine having a color shade and specific surface area which are comparable to those of pigments can be produced through only a single synthesis process using phthalic anhydride or a derivative thereof. Hence, the process of the present invention is an extremely simplified, efficient, economical process as compared with conventional processes in which crude copper phthalocyanine is first synthesized and this crude product is subjected to pigmentation through complicated steps which are time-consuming and require much power.

By dispersing the thus-obtained finely powdered metal phthalocyanine according to the present invention into desired mediums, e.g., resins, varnishes, and plastics depending on use, paint compositions, inks, colorants for plastics, and the like can be produced.

The present invention will be explained below in more detail with reference to the following Examples and Comparative Examples, but the invention is not construed as being limited thereto. All parts, percents and the like are by weight unless otherwise indicated. The pressure was normal pressure unless otherwise indicated.

EXAMPLE 1

Into a 1-liter Attritor made of SUS 316L were introduced 100 parts of phthalic anhydride, 200 parts of urea, 1 part of ammonium molybdate, and 170 parts of "Hisol P" (alkylbenzene, manufactured by Nippon Petrochemical Co., Ltd., Japan). The contents were heated to 200° C. and allowed to react. Subsequently, glass beads (diameter: 2 mm) were packed in the Attritor and 18 parts of cuprous chloride was added. The reactants were then reacted by heating the contents at 210° C. for 3 hours with vigorous agitation. After completion of the reaction, the reaction product was washed with 3,000 parts of methanol with filtration. The resulting cake was added to 3,000 parts of 2% sulfuric acid, and this mixture was stirred with heating at 80° C. for 30 minutes and then subjected to filtration under reduced pressure. The cake was sufficiently washed with warm water until the pH of the resulting filtrate became neutral, and was then dried, thereby obtaining β-form copper phthalocyanine pigment. The yield, purity, specific surface area, content of reactor materials that had come into the pigment as a result of corrosion or wear, and tinting strength were determined. The results obtained are summarized in Table 1 along with the results for the following Examples and Comparative Examples.

The purity was determined by an acid-pasting method in which the dry sample was dissolved in 98% sulfuric acid, the solution was diluted to a concentration of 7%, and the pigment which precipitated was regarded as pure copper phthalocyanine.

The tinting strength was determined by a method in which an oil ink (offset printing ink) was prepared by mixing 4 parts of the copper phthalocyanine pigment with 16 parts of a rosin-modified resin and 500 parts of white varnish by means of a muller mixer, and the color of the ink was determined. The tinting strength of copper phthalocyanine obtained in Comparative Example 1 was taking as 100.

EXAMPLE 2

The same procedures as in Example 1 were conducted except that 200 parts of sodium chloride was further added simultaneously with cuprous chloride. As a result, copper phthalocyanine pigment having exceedingly high tinting strength was obtained.

EXAMPLES 3 AND 4

The same procedures as in Example 1 were conducted except that the material of the Attritor was changed from SUS 316L to high-nickel stainless steel having a nickel content of 25% or more (Example 3) or to Hastelloy C-276 (Example 4). Thus, copper phthalocyanine pigment was produced.

EXAMPLE 5

The same procedures as in Example 1 were conducted except that 100 parts of phthalimide was used in place of 100 parts of phthalic anhydride, that 11.2 parts of copper carbonate and 8.9 parts of copper hydroxide were used in place of 18 parts of cuprous chloride, and that 70 parts of ammonium carbonate was further added. Thus, copper phthalocyanine pigment was obtained.

EXAMPLE 6

The same procedures as in Example 1 were conducted except that a 3-liter test kneader made of SUS 316L was used in place of the 1-liter Attritor made of SUS 316L, and that 400 parts of sodium chloride was further added simultaneously with cuprous chloride, and the reaction was conducted at 210° C. for 5 hours with vigorous agitation. As a result, copper phthalocyanine pigment having exceedingly high tinting strength was obtained.

EXAMPLE 7

The same procedures as in Example 1 were conducted except that the 200 parts of urea was divided into a 133-part portion and a 67-part portion, and the 133-part portion was added at the former step and allowed to react with heating, while the remaining 67-part portion was added after the latter step simultaneously with cuprous chloride. As a result, copper phthalocyanine pigment having a high purity and a clear bright color shade was obtained in a high yield.

EXAMPLE 8

The same procedures as in Example 7 were conducted except that the reaction was conducted under high-pressure conditions of 3 to 4 kg/cm$^2$G and that the amount of urea introduced at the former step was reduced from 133 parts to 100 parts. As a result, copper phthalocyanine pigment having a higher purity and a clear bright color shade could be obtained in a higher yield, despite the urea amount reduction.

EXAMPLE 9

Into a 1-liter Attritor made of SUS 316L were introduced 100 parts of phthalic anhydride, 200 parts of urea, and 1 part of ammonium molybdate. The contents were heated to 200° C. in the absence of a solvent and allowed to react. Subsequently, glass beads (diameter: 2 mm) were packed in the Attritor and 170 parts of diethylene glycol and 18 parts of cuprous chloride were added. The reactants were then reacted by heating the contents at 210° C. for 3 hours with vigorous agitation. After completion of the reaction, the reaction product was added to 3,000 parts of 2% sulfuric acid, and this mixture was stirred with heating at 80° C. for 30 minutes and subjected to filtration under reduced pressure. The resulting cake was sufficiently washed with warm water until the pH of the filtrate became neutral, and was then dried, thereby obtaining β-form copper phthalocyanine.

EXAMPLE 10

The same procedures as in Example 1 were conducted, and sampling was conducted at intervals to determine the change of specific surface area. As a result, the size reduction rate was found to be high as shown in FIG. 1.

EXAMPLE 11

The same procedures as in Example 1 were conducted except that 24 parts of nickelous chloride was used in place of 18 parts of cuprous chloride. As a result, nickel phthalocyanine pigment having high tinting strength was obtained.

EXAMPLE 12

The same procedures as in Example 1 were conducted except that 24 parts of cobaltous chloride was used in place of 18 parts of cuprous chloride. As a result, cobalt phthalocyanine pigment having high tinting strength was obtained.

EXAMPLE 13

Into a turbine impeller type 1-liter reaction vessel made of SUS 316L were introduced 100 parts of phthalic anhydride, 200 parts of urea, 1 part of ammonium molybdate, and 170 parts of "Hisol P". The contents were heated to 200° C. and allowed to react. Subsequently, 18 parts of cuprous chloride was added, and the reactants were then reacted by heating the contents at 200° C. for 5 hours. After completion of the reaction, the reaction product was washed with 3,000 parts of methanol with filtration. The resulting cake was added to 3,000 parts of 2% sulfuric acid, and this mixture was stirred with heating at 80° C. for 30 minutes and then subjected to filtration under reduced pressure. The cake was sufficiently washed with warm water until the pH of the resulting filtrate became neutral, and was then dried, thereby obtaining β-form crude copper phthalocyanine pigment. The yield, purity, specific surface area, content of reactor materials that had come into the pigment as a result of corrosion or wear, and tinting strength were determined. The results obtained are summarized in Table 1.

COMPARATIVE EXAMPLE 1

A mixture of 100 parts of a commercially available crude copper phthalocyanine, 400 parts of sodium chloride, and 100 parts of diethylene glycol was ground for 7 hours in a 3-liter test kneader made of SUS 316L while maintaining the temperature of the mixture at 90° to 95° C. The resulting mixture was heated in 2% sulfuric acid at 80° C. for 30 minutes with stirring and then subjected to filtration under reduced pressure. The cake was washed with warm water until the filtrate became neutral, and was then dried. Thus, copper phthalocyanine pigment of the ordinary kind was produced through a conventional pigmentation method. The yield, purity, specific surface area, content of reactor materials that had come into the pigment as a result of corrosion or wear, and tinting strength were determined. The results obtained are summarized in Table 1. The tinting strength of this copper phthalocyanine pigment was taken as 100 and, based on this, tinting strength measurement was made in the Examples and the other Comparative Examples.

COMPARATIVE EXAMPLE 2

Into a 1-liter Attritor made of SUS 316L and packed with glass beads (diameter: 2 mm) were introduced 100 parts of phthalic anhydride, 200 parts of urea, 1 part of ammonium molybdate, 18 parts of cuprous chloride, and 170 parts of "Hisol P". The reactants were allowed to react by heating the contents at 210° C. for 5 hours with vigorous agitation. Thus, the reaction was conducted without dividing it into two steps. The resulting reaction product was subjected to the same washing, filtration, and drying treatments as those in Example 1. As a result, copper phthalocyanine pigment having a dull color shade was obtained in a low yield due to the corrosion of the reactor.

COMPARATIVE EXAMPLES 3 TO 5

The same procedures as in Comparative Example 2 were conducted except that the Attritor material employed in Comparative Example 2 was changed as shown below. Thus, copper phthalocyanine pigment was obtained.

Comparative Example 3: Attritor made of Hastelloy C-276
Comparative Example 4: Attritor made of titanium
Comparative Example 5: Attritor made of glass

COMPARATIVE EXAMPLE 6

Into a 1-liter glass flask were introduced 30 parts of phthalic anhydride, 50 parts of urea, 1.0 wt % of ammonium molybdate based on the amount of the phthalic anhydride, and 90 parts of a mixed solvent composed of trichlorobenzene and an isoparaffin ("Isopearl M", manufactured by Esso Sekiyu K.K., Japan) in a weight ratio of 2/8. The resulting suspension was heated with stirring and allowed to react at 200° C. for 30 minutes. Subsequently, 8.5 parts of powder of cupric chloride was further added, and the resulting mixture was allowed to react at 170° C. for 60 minutes with stirring. The reaction product thus obtained was filtered off, washed with methanol, subsequently treated with a dilute acid and a dilute alkali, and then subjected to filtration, water washing, and drying. As a result, β-form copper phthalocyanine having slightly poor tinting strength was obtained.

The above results show that even though cupric chloride is added at a latter step in a mixed solvent composed of a high-boiling aromatic solvent and a paraffinic or naphthenic hydrocarbon solvent, mere stirring alone does not yield good phthalocyanine pigment.

TABLE 1

| Example No. | Yield* (%) | Purity (%) | Specific surface area ($m^2/g$) | Content of reactor material in pigment (ppm) | Tinting strength |
|---|---|---|---|---|---|
| Example 1 | 84 | 86 | 65 | 8 | 100 |
| Example 2 | 83 | 86 | 72 | 5 | 120 |
| Example 3 | 84 | 87 | 66 | 6 | 100 |
| Example 4 | 84 | 87 | 67 | 5 | 100 |
| Example 5 | 88 | 86 | 67 | 5 | 100 |
| Example 6 | 84 | 85 | 70 | 6 | 110 |
| Example 7 | 93 | 90 | 70 | 6 | 110 |
| Example 8 | 97 | 95 | 68 | 6 | 110 |
| Example 9 | 83 | 84 | 66 | 8 | 100 |
| Example 11 | 78 | 80 | 68 | 5 | 100 |
| Example 12 | 80 | 82 | 67 | 4 | 100 |
| Example 13 | 84 | 86 | 14 | 3 | — |
| Comparative Example 1 | 97 | 96 | 66 | 8 | 100 |
| Comparative Example 2 | 60 | 70 | 54 | 17,000 | 65 |
| Comparative Example 3 | 65 | 76 | 55 | 2,400 | 75 |
| Comparative Example 4 | 78 | 83 | 66 | 13,000 | 105 |
| Comparative Example 5 | 84 | 86 | 66 | 20 | 105 |
| Comparative Example 6 | 82 | 84 | 42 | 8 | 55 |
| Comparative Example 9 | 88 | 90 | 68 | 5 | 100 |
| Comparative Example 10 | 90 | 91 | 67 | 4 | 100 |
| Comparative Example 11 | 55 | 60 | 58 | 8,000 | 65 |
| Comparative Example 12 | 60 | 64 | 56 | 12,000 | 65 |

Note:
*The yield is the ration of the amount of the metal phthaloycanine pigment actually obtained to the amount of metal phthalocyanine that is theoretically obtained from the phthalic anhydride or a derivative thereof.

COMPARATIVE EXAMPLE 7

The same procedures as in Comparative Example 1 were conducted, and sampling was conducted at intervals to determine the change of specific surface area in the conventional kneader pigmentation method. As a result, the size reduction rate was found to be low as shown in FIG. 1.

COMPARATIVE EXAMPLE 8

The same procedures as in Comparative Example 2 were conducted, and sampling was conducted at intervals to determine the change of specific surface area in the conventional direct synthesis method in which a mechanical grinding force was applied. As a result, the size reduction rate was found to be low as shown in FIG. 1.

COMPARATIVE EXAMPLE 9

The same procedures as in Comparative Example 1 were conducted except that 100 parts of crude nickel phthalocyanine was used in place of 100 parts of crude copper phthalocyanine. Thus, nickel phthalocyanine pigment was obtained.

COMPARATIVE EXAMPLE 10

The same procedures as in Comparative Example 1 were conducted except that 100 parts of crude cobalt phthalocyanine was used in place of 100 parts of crude copper phthalocyanine. Thus, cobalt phthalocyanine pigment was obtained.

COMPARATIVE EXAMPLE 11

The same procedures as in Comparative Example 2 were conducted except that 24 parts of nickelous chloride was used in place of 18 parts of cuprous chloride. As a result, nickel phthalocyanine pigment having a dull color shade was obtained in a low yield.

COMPARATIVE EXAMPLE 12

The same procedures as in Comparative Example 2 were conducted except that 24 parts of cobaltous chloride was used in place of 18 parts of cuprous chloride. As a result, cobalt phthalocyanine pigment having a dull color shade was obtained in a low yield.

The results obtained in Comparative Examples 10 to 12 are also shown in Table 1.

While the invention has been described in detail and with reference to specific embodiments thereof, it will be apparent to one skilled in the art that various changes and modifications can be made therein without departing from the spirit and scope thereof.

What is claimed is:

1. A process for producing a metal phthalocyanine pigment which comprises the steps of:
    reacting phthalic anhydride or a derivative thereof with urea or a derivative thereof with heating in the presence of a catalyst either in the presence or absence of an organic solvent;
    adding to the reaction mixture of the preceding step a metal or its compound capable of constituting the core of said metal phthalocyanine either alone or together with urea or a derivative thereof, without isolating the reaction product from the reaction mixture of the preceding step; and
    allowing the reaction mixture to react while applying a mechanical grinding force in the presence or absence of a grinding agent.

2. A process for producing a metal phthalocyanine pigment which comprises the steps of:
    reacting phthalic anhydride or a derivative thereof with urea or a derivative thereof with heating in the presence of a catalyst in the absence of a solvent;
    adding to the reaction mixture of the preceding step a hydrophilic solvent and a metal or its compound capable of constituting the core of said metal phthalocyanine either alone or together with urea or a derivative thereof, without isolating the reaction product from the reaction mixture of the preceding step; and allowing the reaction mixture to react while simultaneously applying a mechanical grinding force in the presence or absence of a grinding agent.

3. A process as claimed in claim 1, wherein said metal phthalocyanine pigment is a crude metal phthalocyanine pigment.

4. A process as claimed in claim 2, wherein said metal phthalocyanine pigment is a crude metal phthalocyanine pigment.

5. A process as claimed in claim 1, wherein said metal or its compound capable of constituting the core is copper or a compound thereof.

6. A process as claimed in claim 2, wherein said metal or its compound capable of constituting the core is copper or a compound thereof.

* * * * *